United States Patent [19]

Mueller

[11] Patent Number: 4,562,688
[45] Date of Patent: Jan. 7, 1986

[54] APPARATUS AND METHOD FOR APPLYING HEAT-SHRINKABLE MEMBERS TO CONTAINERS

[75] Inventor: Martin Mueller, Wonder Lake, Ill.

[73] Assignee: Osgood Industries, Inc., Northbrook, Ill.

[21] Appl. No.: 506,018

[22] Filed: Jun. 20, 1983

[51] Int. Cl.$^4$ .............................................. B65B 53/02
[52] U.S. Cl. ...................................... 53/399; 53/292; 53/442; 53/557; 53/585
[58] Field of Search ................. 53/291, 292, 293, 313, 53/314, 315, 388, 442, 557, 399, 585; 156/86

[56] References Cited

U.S. PATENT DOCUMENTS

| | | | |
|---|---|---|---|
| 2,904,943 | 9/1959 | Dreyfus et al. | 53/388 X |
| 3,012,388 | 12/1961 | Stover | 53/315 |
| 3,114,226 | 12/1963 | Taggert et al. | 53/388 |
| 3,280,534 | 10/1966 | Hildebrandt et al. | 53/315 |
| 3,380,225 | 4/1968 | Ochs et al. | 53/315 |
| 3,640,049 | 2/1972 | Fritz et al. | 53/442 |
| 3,924,387 | 12/1975 | Konstantin | 53/291 |
| 3,959,065 | 5/1976 | Ashcroft | 53/557 |
| 4,293,364 | 10/1981 | Fujio | 53/292 |

*Primary Examiner*—John Sipos
*Assistant Examiner*—Michael D. Folkerts
*Attorney, Agent, or Firm*—Dressler, Goldsmith, Shore, Sutker & Milnamow, Ltd.

[57] ABSTRACT

An apparatus and method are disclosed for continuously applying heat-shrinkable members to containers, such as for formation of tamper-evident seals, protective sleeves, labels, or the like. The apparatus includes a conveyor for carrying and moving the containers, and further includes an inclined gravity feed magazine for holding a quantity of the annular-shaped heat-shrinkable members. The apparatus includes a transfer mechanism which uniquely functions to apply a suction to each of the heat-shrinkable members received from the feed magazine so that each member is releasably retained at an acute angle with respect to the direction of movement of the containers on the conveyor. In this way, each container engages its respective one of the heat-shrinkable members to move it from the transfer mechanism into association with the container. In order to maintain the heat-shrinkable members in a predetermined position with respect to the containers before they are heated for shrinking, the apparatus can include a pair of cooled, positioning support rails upon which the heat-shrinkable members are slidably supported after they have been transferred into association with the containers as the containers and the members are moved by the conveyor into a heat tunnel. The heat tunnel heats the heat-shrinkable members, causing them to shrink into conformance with the containers, with a rotating mechanism preferably provided in association with the heat tunnel for rotating the containers and their members as the members are heated.

27 Claims, 6 Drawing Figures

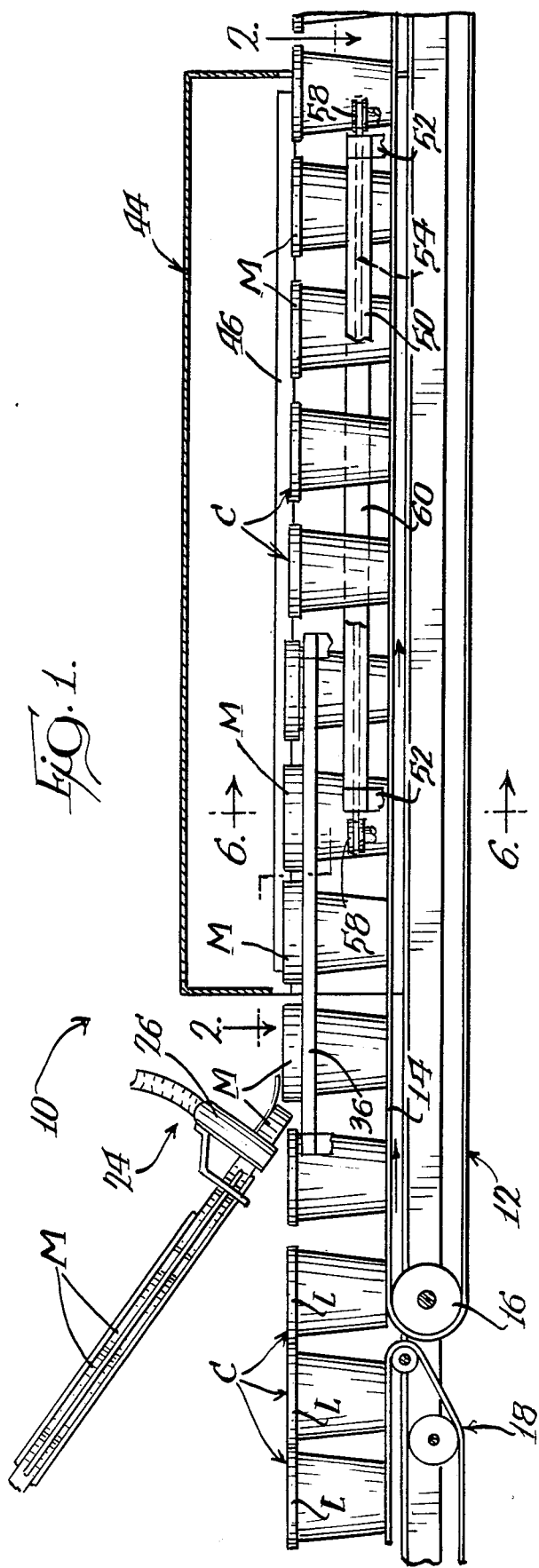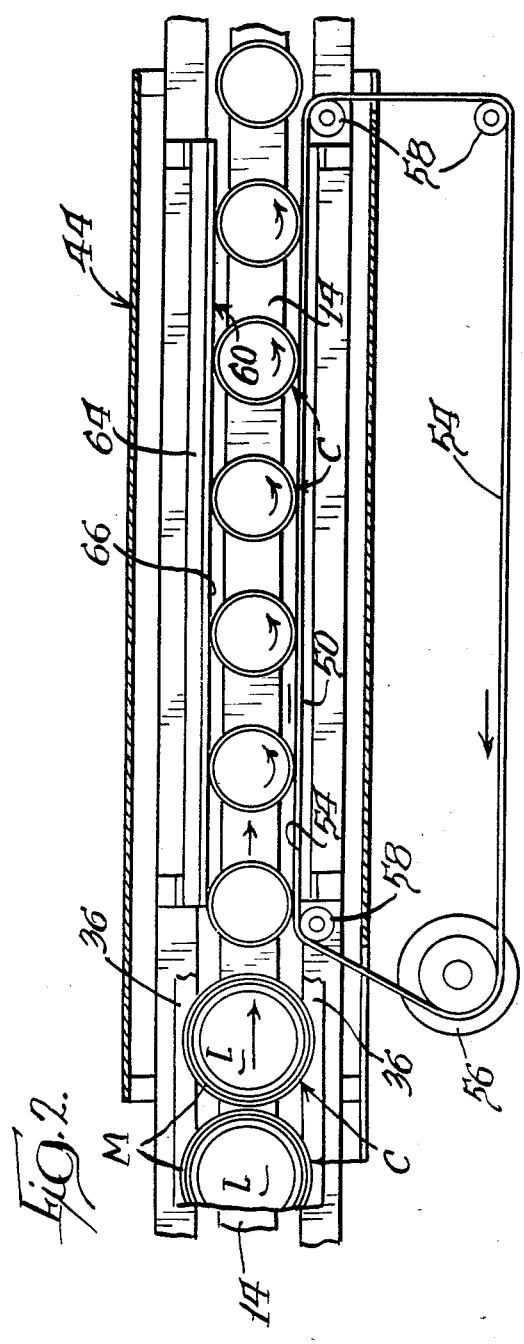

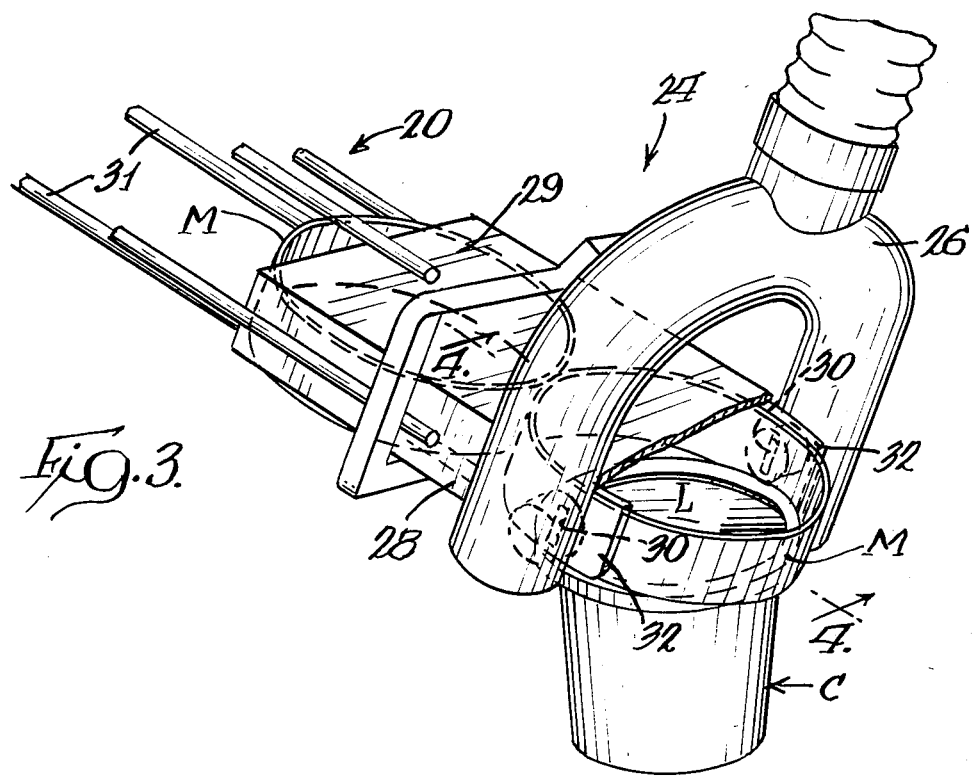
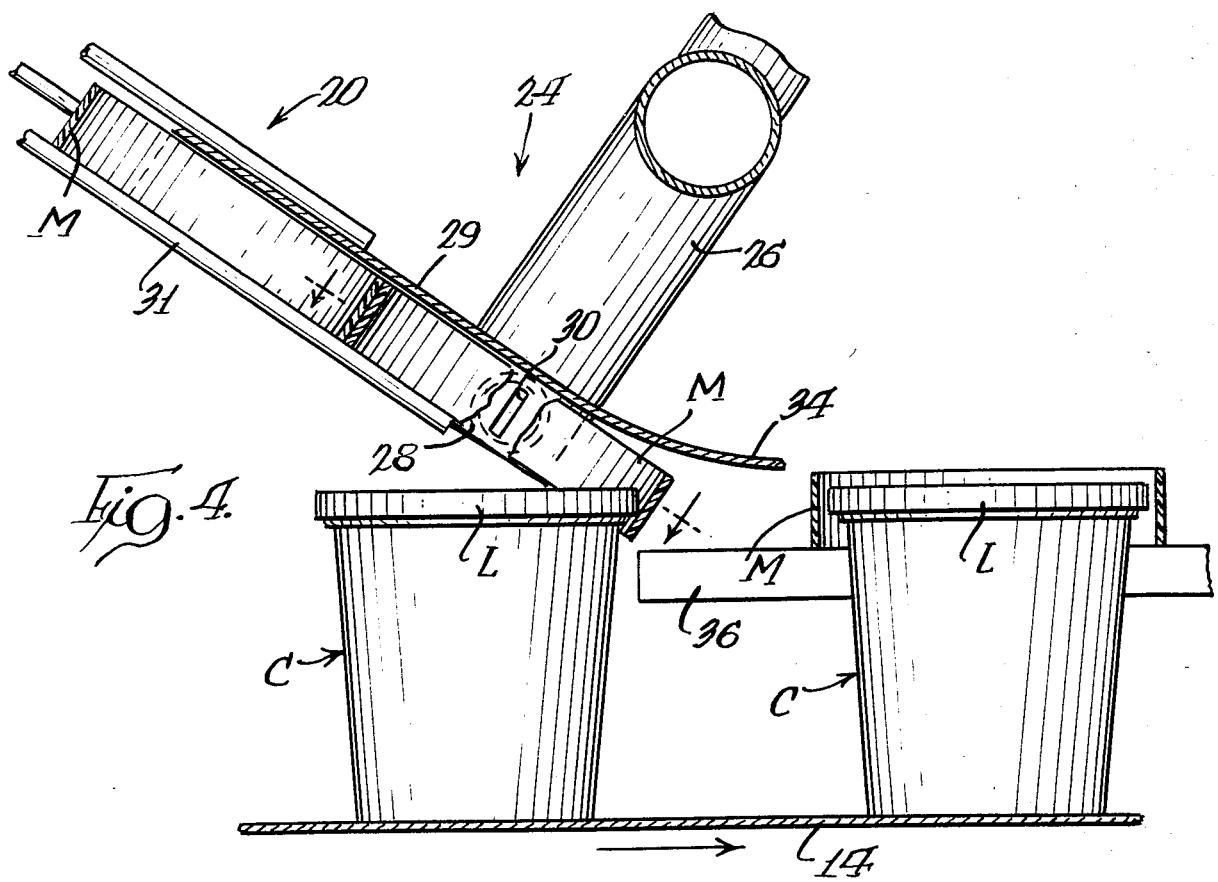

APPARATUS AND METHOD FOR APPLYING HEAT-SHRINKABLE MEMBERS TO CONTAINERS

TECHNICAL FIELD

The present invention relates generally to arrangements for applying heat-shrinkable members to containers, and more particularly to an improved arrangement for applying such members to containers, including a vacuum-operated transfer mechanism for automatically transferring the members from a feed magazine into respective association with the containers as the containers are conveyed past the transfer mechanism.

BACKGROUND OF THE INVENTION

In order to assure that consumer items such as food products, beverages, pharmaceuticals, and the like have not been opened or tampered with prior to purchase, it is very desirable to provide a tamper-evident seal on the containers for such items. Such tamper-evident seals, sometimes referred to as tamper bands, are ordinarily applied to containers after they have been sealed such that any opening or attempted opening of the container results in visually discernible alteration or destruction of the tamper-evident seal.

One type of tamper-evident seal used on containers comprises a heat-shrinkable member applied to each container. Such heat-shrinkable members are typically formed as annular shaped, cylindrical tubular segments which are positioned on the containers, and are thereafter heated so that the members heat-shrink into conformance with the associated containers. For tamper-indication, the heat-shrinkable members are usually positioned such that they shrink into close-fitting association with the lid or like closure of the container so that removal or attempted removal of the lid permanently deforms the associated heat-shrinkable member. For other applications, heat-shrinkable members are fitted to containers so as to form closely-fitting sleeves for the containers. Such sleeves can be provided for protecting and rigidifying the container itself, and/or the heat-shrinkable members can be suitably printed so as to form labels for the containers. If desired, a heat-shrinkable member can be fitted to a container for multiple purposes, such as to provide a combination protective sleeve/tamper band.

Copending U.S. patent application Ser. No. 451,401, filed Dec. 20, 1982, discloses a method and apparatus for forming spirally-wound, heat-shrinkable members in the form of tubular segments each having a generally cylindrical configuration. The method and apparatus of this copending application permit highly efficient and inexpensive manufacture of heat-shrinkable members suited for subsequent application to containers by heat-shrinking. Accordingly, it is highly desirable to provide a method and apparatus for efficiently and continuously applying heat-shrinkable members to containers to provide the containers with tamper-bands, protective sleeves, or the like.

SUMMARY OF THE INVENTION

The present invention contemplates a method and apparatus for continuously and automatically applying annular-shaped, heat-shrinkable members to containers. Notably, the arrangement includes a very efficient transfer mechanism for continuously positioning the heat-shrinkable members in respective association with a continuous supply of containers. Further, the apparatus can include a unique arrangement for supporting and positioning each heat-shrinkable member in a predetermined position with respect to its associated container prior to heating of the member for heat-shrink fitment to the container. This feature of the present invention facilitates application of an appropriately sized heat-shrinkable member to a container which is not suitably configured to support the heat-shrinkable member in the desired relative position prior to and during heat-shrinking of the member into conformance with the container.

The apparatus of the present invention includes a container conveyor for carrying and moving the containers to which the annular-shaped, heat-shrinkable members are to be respectively applied. The apparatus further includes a feed magazine positioned in association with the container conveyor for holding a quantity of the heat-shrinkable members. The feed magazine is preferably inclined so that the feed of the heat-shrinkable members is by gravity.

The apparatus further includes a transfer mechanism for transferring the heat-shrinkable members from the feed magazine into respective association with the containers on the conveyor. The transfer mechanism is positioned above the container conveyor, and functions such that the heat-shrinkable members are sequentially releasably retained at an acute angle with respect to the direction of movement of the container conveyor. By releasably holding each heat-shrinkable member within the path of the moving containers, each container acts against its respective member by engagement with its inside surface to move the member from the transfer mechanism into association with the container for subsequent heat-shrinking. Notably, the transfer mechanism includes means for applying suction to the transversely opposite outer sides of each heat-shrinkable member for releasably retaining each member. The transfer mechanism further preferably includes a pair of stops positioned adjacent the suction-applying means. The stops are spaced apart a distance less than the transverse dimension of each heat-shrinkable member, and thus coact with the suction-applying means to releasably retain each member for transfer to its respective container.

The present apparatus further includes a heat tunnel or the like for heating each heat-shrinkable member so that it shrinks into conformance with its respective container. As will be recognized, some containers are configured such that each container supports its respective heat-shrinkable member in the desired relative position, so that subsequent heating of the member shrinks it into the desired conformance with the container, such as for formation of a tamper band. For example, some containers include a neck portion and closure which are relatively smaller (in cross-section) than the remainder of the container. Thus, the container provides a shoulder upon which a heat-shrinkable member may be supported so that shrinking of the member causes it to conform to the neck portion and closure of the container.

In distinction, many containers are configured such that the container itself cannot support a heat-shrinkable member in the desired relative position, such as for formation of a tamper-evident seal at the closure of the container. For example, many containers include a removable lid portion which substantially defines the upper surface of the container, with the remainder of the container extending downwardly of the lid portion, frequently with an inwardly tapering configuration. In order to accommodate positioning of a heat-shrinkable member in association with the upper portion of the container (such as about its lid portion), the present apparatus includes means for supporting each heat-shrinkable member is a predetermined position relative to its respective container prior to the member being heat-shrunk into conformance with the container. In the illustrated embodiment, the positioning means comprises a pair of support rails which extend generally from the transfer mechanism of the apparatus into its heat tunnel. By this arrangement, each container moves its respective heat-shrinkable member from the transfer mechanism, and the member is thereafter slidably supported upon the support rails. Since the support rails extend into the heat tunnel, the heat-shrinkable members are supported until they shrink sufficiently to maintain themselves in the desired relative position with respect to their associated containers.

Because the support rails extend into the heat tunnel, it is desirable to avoid excessive heating of the rails so that the heat-shrinkable members do not begin to soften and stick to the rails, or shrink in an undesired manner as soon as they contact the support rails. Accordingly, means are provided for cooling the support rails, with the cooling means preferably comprising coolant passages defined by the support rails through which coolant is circulated.

In order to facilitate even and uniform shrinkage of the heat-shrinkable members as they pass through the heat tunnel, the present apparatus preferably includes means for rotating the containers with respect to the container conveyor as the heat-shrinkable members are heated. In the illustrated embodiment, this rotating action is provided by a driven belt which extends within the heat tunnel, with the belt acting in cooperation with a fixed guide to rotate the containers (and their associated heat-shrinkable members) as the heat-shrinkable members are heated.

Numerous other features and advantages of the present invention will become readily apparent from the following description, the accompanying drawings, and the appended claims.

BRIEF DESCRIPTION OF THE DRAWINGS

FIG. 1 is a diagrammatic side elevational view, in partial cutaway, illustrating an apparatus for applying heat-shrinkable members embodying the principles of the present invention;

FIG. 2 is a diagrammatic top plan view of the present apparatus taken along lines 2—2 in FIG. 1;

FIG. 3 is an enlarged perspective view, in partial cutaway, of a portion of the apparatus illustrated in FIG. 1;

FIG. 4 is a cross-sectional view taken generally along lines 4—4 of FIG. 3;

DETAILED DESCRIPTION

Figure 5:
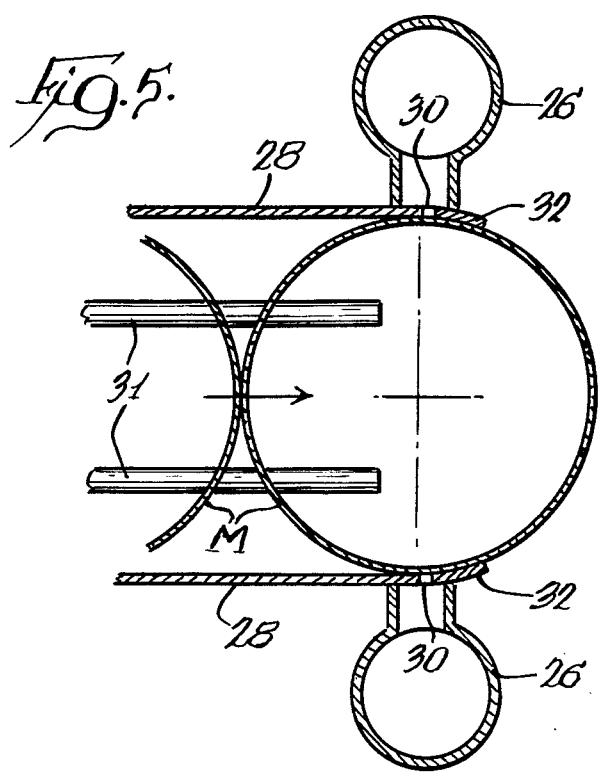
FIG. 5 is a view, in partial cross-section, taken generally along lines 5—5 of FIG. 4.

While the present invention is susceptible of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIGS. 1 and 2 diagrammatically illustrate an apparatus 10 embodying the principles of the present invention for applying heat-shrinkable members to containers. As will be further described, the present apparatus is adapted to automatically and continuously function to sequentially or serially apply the heat-shrinkable members, designated M, in respective association with the containers, each designated C, and each including a lid portion L.

Each heat-shrinkable member M is annular-shaped and generally cylindrical in configuration, with each being appropriately sized relative to the dimensions of each container C for the intended purpose of the heat-shrinkable members. Thus, heat-shrinkable members M are illustrated of a size which is appropriate for formation of tamper-evident seals (i.e., tamper bands) on containers C. Each member M is preferably predominantly heat-shrinkable in a radial direction with respect to the axis of each member. Members M having this characteristic can be very efficiently formed by spiral winding in accordance with the teachings of copending U.S. patent application Ser. No. 451,401, filed Dec. 20, 1982. As will be recognized, the present invention is readily adaptable for application of heat-shrinkable members which have been otherwise formed. Each member M comprises suitably thin, heat-shrinkable material, preferably expanded polystyrene. Other heat-shrinkable expanded thermoplastic materials, such as polypropylene, polyethylene, and polyvinyl chloride, can also be used. As will be recognized, formation of members M from such material results in some resilient flexibility for each of the members M.

The apparatus 10 of the present invention includes a container conveyor, designated 12, including an upper run 14 for carrying and moving containers C in the direction of the arrows shown in FIG. 1. The conveyor 12 can include suitable conveyor rollers 16 for support thereof. Because containers C are preferably carried on conveyor 12 so that the portions of the containers that receive members M are spaced apart, the containers C may be supplied to conveyor 12 from a feed conveyor 18 which moves at a speed less than that of conveyor 12 for spacing the containers on conveyor 12.

As containers C are advanced by conveyor 12, the present method contemplates that the heat-shrinkable members M are positioned in respective association with the containers C for subsequent heating of the members M so that they shrink into conformance and embrace each container C. To this end, the apparatus 10 includes an inclined gravity feed magazine 20 positioned in association with conveyor 12. The feed magazine 20 is adapted to hold a quantity of the members M for sliding movement by gravity. The members M intermittently move within the feed magazine 20 as the members M are received one-at-a-time by a transfer mechanism, designated 24, positioned at the end of the feed magazine above container conveyor 12.

The transfer mechanism 24 functions to releasably retain each member M so that each member extends into the path of the moving containers. Each member M is releasably held relative to the moving containers C at an acute angle with respect to the direction of movement of containers C on conveyor 12. By releasably positioning each member M in this manner, the forwardly disposed inside surface each member M is engaged by a forwardly disposed portion of its respective one of the containers C and withdrawn from the transfer mechanism. Each member M is preferably held at an acute angle by the transfer mechanism 24 in the sense that the plane extending through each member perpendicularly to its axis is disposed at an acute angle to the direction of movement of containers C. This transfer action is best illustrated in FIGS. 3, 4, and 5.

Notably, the transfer mechanism 24 includes an arrangement for applying suction to each member M for releasably retaining each member in position for transfer to its respective container. To this end, the transfer mechanism includes a bifurcated vacuum plenum 26 connected to a pair of side plates 28 which extend from feed magazine 20. Each side plate 28 defines a preferably slot-like suction port 30 in communication with vacuum plenum 26 such that a suction is created at each suction port 30. The suction ports 30 apply suction to transversely opposite outer sides of each heat-shrinkable member M so that each member M is releasably retained in position for transfer to its respective container C. In this regard, the suction ports 30 are preferably spaced apart a distance which corresponds to the maximum transverse dimension or outer diameter of each heat-shrinkable member M.

Experience has shown that the preferred slot-like configuration of each suction port 30 desirably permits suction to be applied to each member M generally along the vertical extent of each member M, with suction preferably applied at or just forwardly of the transverse center line of each member M (see FIG. 5). By this arrangement, undesired deformation of the members M by application of suction thereto is avoided. Because each member is relatively flexible, application of suction to each member substantially ahead of or behind its transverse center line can result in each member undesirably "bowing" or otherwise being deformed from a circular configuration. The degree of suction applied is selected according to the weight of the members M, bearing in mind that the members are preferably formed from heat-shrinkable material which is relatively lightweight. Thus, the vacuum within plenum 26 will usually be on the order of several pounds per square inch below atmospheric pressure.

Thus, as each member M is moved from the transfer mechanism 24 by engagement by its respective container C, the following one of the members M moves downwardly by gravity within feed magazine 20 and is received within the transfer mechanism. An upper plate 29 and lower guides 31 of the feed magazine 20 act to guide each member M into the transfer mechanism 24 until the suction applied via suction ports 30 acts to grip each member and retain it an acute angle with respect to the container conveyor 12.

Because the suction applied to each member M must be sufficiently small to permit each member M to be moved from the transfer mechanism 24 by its respective container C, a pair of spaced apart, inturned stops 32 are preferably provided respectively positioned adjacent the suction ports 30, with the stops 32 being formed from portions of side plates 28. The stops 32 provide an indexing action by engaging each member M as it is held by suction ports 30 to further releasably retain each member M in position for transfer to its respective container C. Accordingly, the stops are spaced apart a distance less than the transverse dimension (i.e. diameter) of each member M. By this construction, sequential transfer of members M to containers C is effected on a continuous basis as the containers C are moved on conveyor 12.

As will be recognized, feed magazine 20 and the transfer mechanism 24 desirably are of straightforward construction for ease of fabrication and maintenance, and provide for highly efficient transfer of members M into respective association with containers C. If desired, the transfer mechanism may include an upper arcuate guide 34 (shown as a portion of upper plate 29) which is adapted to engage the heat-shrinkable members M as they are "picked up" by their respective containers C to assure that the members M move downwardly into proper position with respect to the containers.

The portions of the present apparatus thus far described effect sequential or serial transfer of members M into respective association with containers C. For many applications, this transfer step can be effected so as to position each member M in the desired position relative to its container C so that subsequent heating of the member M causes it to shrink and embrace the container C in the intended manner, such as for tamper-indication. For example, if members M are to be fitted to containers each having a shoulder portion positioned relatively close to the container's neck portion and closure, the members M can be transferred to such containers so that each member M rests upon the shoulder of its respective container. Subsequent heating of the members M then results in their heat-shrinking into conformance with the containers, such as to embrace the closure of each container for tamper-indication.

The containers C in the illustrated embodiment do not include a shoulder portion or the like upon which the members M can be positioned so that the members are held in the desired relative position with respect to the containers C. Accordingly, the illustrated embodiment of the present apparatus includes an arrangement for positioning each member M in a predetermined position relative to its respective container C so that subsequent heating of the member results in its conformance with the intended portion of container C (i.e., such that the member M embraces the upper portion of the container C and its lid portion L for tamper-indication).

The positioning arrangement of the present apparatus includes a pair of positioning support rails 36 which extend on respective opposite sides of container conveyor 12. Each support rail 36 is suitably mounted on a rail mount 38, with each support rail 36 defining an internal coolant passage 40 through which coolant flows for cooling of the support rails.

As will be further described, the members M are heated for shrinking by a heat tunnel 44 of the apparatus 10. As best shown in FIG. 1, support rails 36 extend generally from the point of transfer of members M to containers C at transfer mechanism 24, in the direction of conveyor movement into heat tunnel 44. By this arrangement, the members M are slidably supported upon the support rails 36 prior to and during initial heating of the members M within heat tunnel 44. As the members M are moved along support rails 36 by the movement of containers C on conveyor 12, the support rails maintain the members M in a predetermined relative position with respect to the containers C until the members M have been sufficiently heated to partially shrink them into conformance with the containers C sufficiently to hold the members M in correct position on containers C for completion of heat-shrink fitment.

Because the support rails 36 extend within heat tunnel 44 a sufficient distance to support the members M until the members M support themselves on the respective containers C, the support rails absorb a significant amount of heat energy. By providing the support rails 36 with coolant passages 40, the heat absorbed by the support rails is removed by coolant (such as water) flowing through the passages, thus desirably acting to prevent the support rails from becoming excessively heated. Without cooling of the support rails, their heat could otherwise result in the members M becoming softened and tacky so as to undesirably adhere to the rails, or result in undesired, premature shrinkage of the members M as they are transferred into association with the containers C. Thus, cooling of the support rails desirably acts to prevent the members M from excessively heat-shrinking as soon as the members M contact the support rails, and from adhering to the rails.

Figure 6:
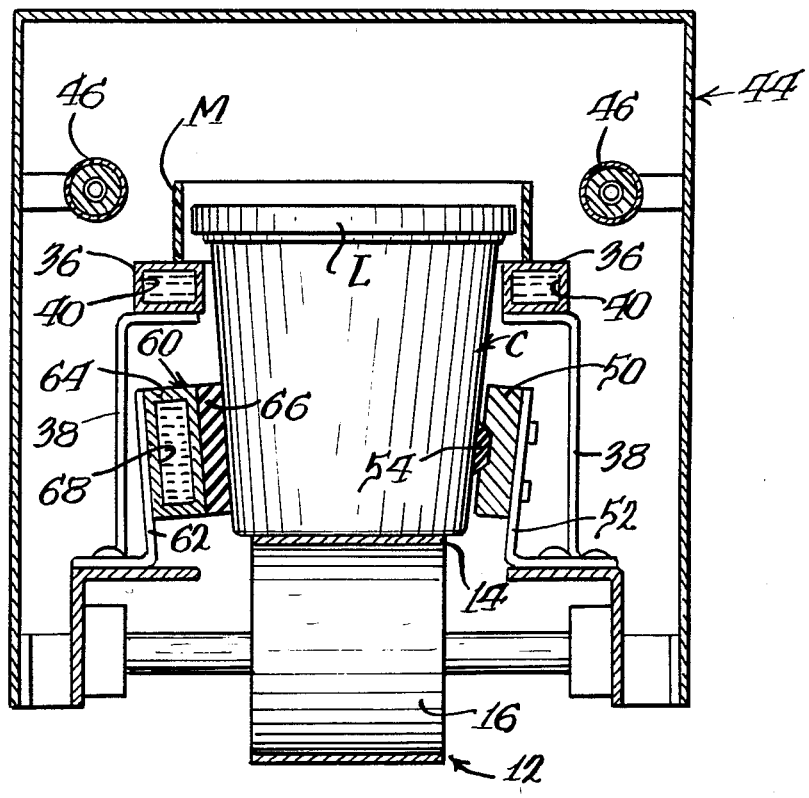
FIG. 6 is an enlarged cross-sectional view of the apparatus illustrated in FIG. 1 taken generally along lines 6—6 in FIG. 1.

The heat tunnel 44 typically includes elongated, electrically-powered heating elements 46 (sometimes referred to as "calrods") positioned on respective opposite sides of container conveyor 12 (FIG. 6). The heat tunnel 44 is preferably constructed such that its heating elements are positioned proximate to the members M as the members are slidably advanced along and off of rails 36 by movement of containers C on conveyor 12. Thus, the radiant heat energy from the heating elements 46 impinges upon the heat-shrinkable members M so that they shrink into conformance and embrace their respective containers C.

In order to enhance uniform heating and heat-shrinkage of members M as they pass through heat tunnel 44, an arrangement is preferably provided for rotating the containers (and their respective members M) as the members are heated within the heat tunnel. To this end, the present apparatus includes a belt guide 50 which extends longitudinally within at least a portion of heat tunnel 44 along one side of container conveyor 12. The belt guide 50, which is held by one or more guide supports 52, acts to guide a driven rotating belt 54 which extends along and is movable with respect to the belt guide 50. A suitable belt drive motor 56, preferably positioned outside of heat tunnel 44, acts to drive rotating belt 54 in the direction of movement of container 12, preferably at a substantially greater speed than the speed of movement of conveyor 12. A plurality of guide rollers 58 are preferably provided for guiding the movement of belt 54 between motor 56 and belt guide 50.

The rotating belt 54 is adapted to engage a plurality of the containers C as they move within heat tunnel 44, and rotate the containers C with respect to the conveyor 12. To this end, a fixed rotating guide 60 is provided for cooperation and coaction with the rotating belt 54. The fixed rotating guide 60 extends within heat tunnel 44 in generally opposed relation to belt 54 on the opposite side of conveyor 12. The guide 60, which may be mounted upon one or more guide supports 62, includes a tubular portion 64 to which is affixed an elastomeric surface 66 which engages the containers 12. As the containers are advanced through heat tunnel 44 by conveyor 12, each container is moved into engagement with belt 54 and fixed guide 60 such that the belt 54 rotates the containers as the containers rollingly engage the fixed guide 60. By this arrangement, the containers and their respective heat-shrinkable members M are rotated during heating of the members M within the heat tunnel 44, thus assuring complete and uniform shrinkage of the members into conformance with the containers. Notably, the preferably tubular portion 64 of fixed rotating guide 60 defines a coolant passage 68 through which coolant (such as water) flows, thus desirably acting to cool the elastomeric surface 66 of the guide and thereby enhance the useful service life of the elastomeric material forming the surface 66 (which would otherwise deteriorate undesirably quickly because of the heat to which it is subjected within heat tunnel 44). When the containers C exit the heat tunnel 44, application of the heat-shrinkable members M is complete. The containers can then be transferred for subsequent packaging, storage, and/or shipment. When, as in the illustrated embodiment, members M have been applied for tamper-indication, any attempt to open one of the containers results in a permanent and visually discernible deformation of the tamper-evident seal thus formed.

From the foregoing, it will be observed that numerous variations and modifications may be effected without departing from the true spirit and scope of the novel concept of the present invention. It will be understood that no limitation with respect to the specific apparatus illustrated herein is intended or should be inferred. It is, of course, intended to cover by the appended claims all such modifications as fall within the scope of the claims.

What is claimed is:

1. A method of applying heat-shrinkable members to containers, comprising the steps of:
   providing feed magazine means for holding a quantity of said members;
   moving said containers on conveyor means positioned in association with said feed magazine means;
   transferring each said member from said magazine means into respective association with one of said containers with transfer means which releasably retains each said member for engagement by its respective container by applying suction to each said member for releasably retaining each said member at an acute angle with respect to the direction of movement of said containers on said conveyor means, whereby said containers respectively move said members from said transfer means as said containers are moved with respect to said transfer means; and
   heating said members for heat-shrinking said members into conformance with said containers.

2. A method in accordance with claim 1, including moving said members in said feed magazine means by gravity for subsequent transfer of said members to said containers.

3. A method in accordance with claim 1, including supporting each said member in a predetermined position with respect to its respective container after transfer thereto with support means positioned in association with said conveyor means.

4. A method in accordance with claim 3, including cooling said support means.

5. A method in accordance with claim 1, including rotating said containers during heating of said members for heat-shrinking said members.

6. A method in accordance with claim 1, wherein said heating step comprises moving said containers and said respectively associated members through heat tunnel means on said conveyor means,
   said method including supporting said members in a predetermined position with respect to said containers on support rails positioned on respective opposite sides of said conveyor means so that said members are supported from the point of transfer from said feed magazine means prior to heating of said members by said heat tunnel means, and cooling said support rails by flowing coolant therethrough, said method further including rotating said containers during heating of said members in said heat tunnel means.

7. A method of applying annular, generally cylindrical heat-shrinkable members to containers, comprising the steps of:

providing feed magazine means for holding a quantity of said members;

moving said containers on conveyor means positioned in association with said feed magazine means;

transferring each said member from said magazine means into respective association with one of said containers with transfer means which releasably retains each said member at an acute angle with respect to the direction of movement of said containers so that each said member extends into the path of said moving containers for engagement of an inside surface of each said member by a respective one of said containers whereby said containers respectively move said members from said transfer means as said containers are moved with respect thereto, said transferring step including applying suction to the transversely opposite sides of each said member to releasably retain each said member in said transfer means, heating said members for heat-shrinking said members into conformance with said containers.

8. An apparatus for continuously applying heat-shrinkable members to containers, comprising:

conveyor means for moving said containers;

magazine means positioned in association with said conveyor means for holding a quantity of said members;

transfer means for transferring said members from said magazine means into respective association with said containers, said transfer means comprising vacuum retaining means adapted to receive said members from said magazine means and apply suction to at least one side of each member to releasably retain each member at an acute angle with respect to the direction of movement of said containers on said conveyor means whereby each said container acts to move the respective one of said members from said transfer means as said containers are moved by said conveyor means with respect to said transfer means; and means for heating said members for shrinking said members into conformance with said containers.

9. An apparatus in accordance with claim 8, wherein said magazine means comprises an inclined feed magazine for gravity-feed of said members to said transfer means.

10. An apparatus in accordance with claim 8, wherein said transfer means further comprises stop means operatively positioned adjacent said vacuum means, said stop means being adapted to engage each of said members as each of said members is received by said vacuum means for further releasably retaining each of said members for transfer to said containers.

11. An apparatus in accordance with claim 8, including means for positioning said members with respect to said containers after each said member has been transferred to the respective one of said containers, said positioning means acting to maintain said members in a predetermined relative position with respect to said containers prior to said members being heat-shrunk into conformance with said containers.

12. An apparatus in accordance with claim 11, including means for cooling said positioning means.

13. An apparatus in accordance with claim 12, wherein said cooling means comprises coolant passage means defined by said positioning means for accommodating the flow of coolant therethrough.

14. An apparatus in accordance with claim 8, including means for rotating said containers with respect to said conveyor means during heating of said members by said heating means.

15. An apparatus in accordance with claim 14, wherein said rotating means comprises driven belt means adapted to engage said containers during heating of said members by said heating means, and fixed guide means adapted to engage said containers and coact with said driven belt means so that said containers are rotated during heating of said members by said heating means.

16. An apparatus for continuously applying annular-shaped heat-shrinkable to containers, comprising:

conveyor means for carrying and moving said containers;

feed magazine means positioned in association with said conveyor means for holding a quantity of said members;

transfer means positioned above said conveyor means for transferring said members from said feed magazine means into respective association with said containers, said transfer means including vacuum means adapted to receive said members from said feed magazine means for releasably retaining each said member such that each said member is moved from said transfer means by its respective container as said containers are moved on said conveyor means past said transfer means, said vacuum means including vacuum plenum means adapted to apply suction to the transversely opposite outer sides of each said member for releasably retaining each said member at an acute angle with respect to the direction of movement of said containers on said conveyor means; and means for heating said members for shrinking said members into conformance with said containers.

17. An apparatus in accordance with claim 16, wherein said transfer means further includes stop means positioned adjacent said vacuum means for further releasably retaining each said member, said stop means comprising a pair of spaced apart stops adapted to releasably engage each said member received by said vacuum means, said stops being spaced apart a distance less than the transverse dimension of each said member.

18. An apparatus in accordance with claim 16, including means for positioning said members with respect to said containers after each said member has been transferred to the respective one of said containers, said positioning means comprising a pair of support rails disposed on respective opposite sides of said conveyor means, said support rails being adapted to slidably support each said member in a predetermined position with respect to its respective container as said members and said containers are moved with respect to said support rails by said conveyor means.

19. An apparatus in accordance with claim 18, including means for cooling said support rails comprising internal coolant passage means defined by each said support rail.

20. An apparatus in accordance with claim 18, wherein said heating means comprises a heat tunnel through which said containers and said members are moved by said conveyor means, said support rails extending along respective sides of said conveyor means generally from the position of said transfer means into said heat tunnel.

21. An apparatus in accordance with claim 20, including means for rotating said containers during movement thereof through said heat tunnel, said rotating means comprising a driven belt extending within said heat tunnel on one side of said conveyor means, said driven belt being adapted to engage said containers, and a fixed guide positioned within said heat tunnel on the other side of said conveyor means, said containers being adapted to rollingly engage said fixed guide as said containers are rotated by said driven belt.

22. An apparatus in accordance with claim 21, including means for driving said driven belt within said heat tunnel in the direction of movement of said conveyor means at a speed substantially greater than the speed of movement of said conveyor means.

23. An apparatus in accordance with claim 21, including means for cooling said fixed guide comprising coolant passage means defined by said fixed guide.

24. An apparatus for continuously applying heat-shrinkable members to containers, comprising:

conveyor means for moving said containers;

magazine means positioned in association with said conveyor means for holding a quantity of said members;

transfer means for transferring said members from said magazine means into respective association with said containers, said transfer means releasably retaining each said member for engagement by the respective one of said containers to move said members from said transfer means as said containers are moved by said conveyor means with respect to said transfer means, said transfer means comprising vacuum means for applying suction to each said member to releasably retain each said member, and a pair of spaced apart stops positioned in operative association with said vacuum means to further releasably retain each said member, said stops being spaced apart a distance less than the transverse dimension of said members; and means for heating said members for shrinking said members into conformance with said containers.

25. An apparatus in accordance with claim 24, wherein said transfer means releasably retains each said member at an acute angle with respect to the direction of movement of said containers on said conveyor so that each said member extends into the path of said containers for engagement of its inside surface by the respective one of said containers.

26. An apparatus in accordance with claim 25, wherein said vacuum means includes a pair of suction port means for respectively applying suction to the transversely opposite sides of each said member for releasably retaining each said member in said transfer means.

27. An apparatus in accordance with claim 26, wherein said pair of spaced apart stops are respectively positioned adjacent said suction port means for engaging each said member to further releasably retain each said member in said transfer means.

* * * * *